(No Model.) 8 Sheets—Sheet 1.

H. A. HOUSEMAN.
CIRCULAR KNITTING MACHINE.

No. 484,738. Patented Oct. 18, 1892.

WITNESSES:
INVENTOR:

(No Model.)  8 Sheets—Sheet 3.

H. A. HOUSEMAN.
CIRCULAR KNITTING MACHINE.

No. 484,738.  Patented Oct. 18, 1892.

WITNESSES:  INVENTOR:

(No Model.)  
8 Sheets—Sheet 4.

H. A. HOUSEMAN.
CIRCULAR KNITTING MACHINE.

No. 484,738. Patented Oct. 18, 1892.

WITNESSES:  
David S. Williams  
Frank S. Busser

INVENTOR:  
Harry A. Houseman  
By his atty  
J. F. Harding

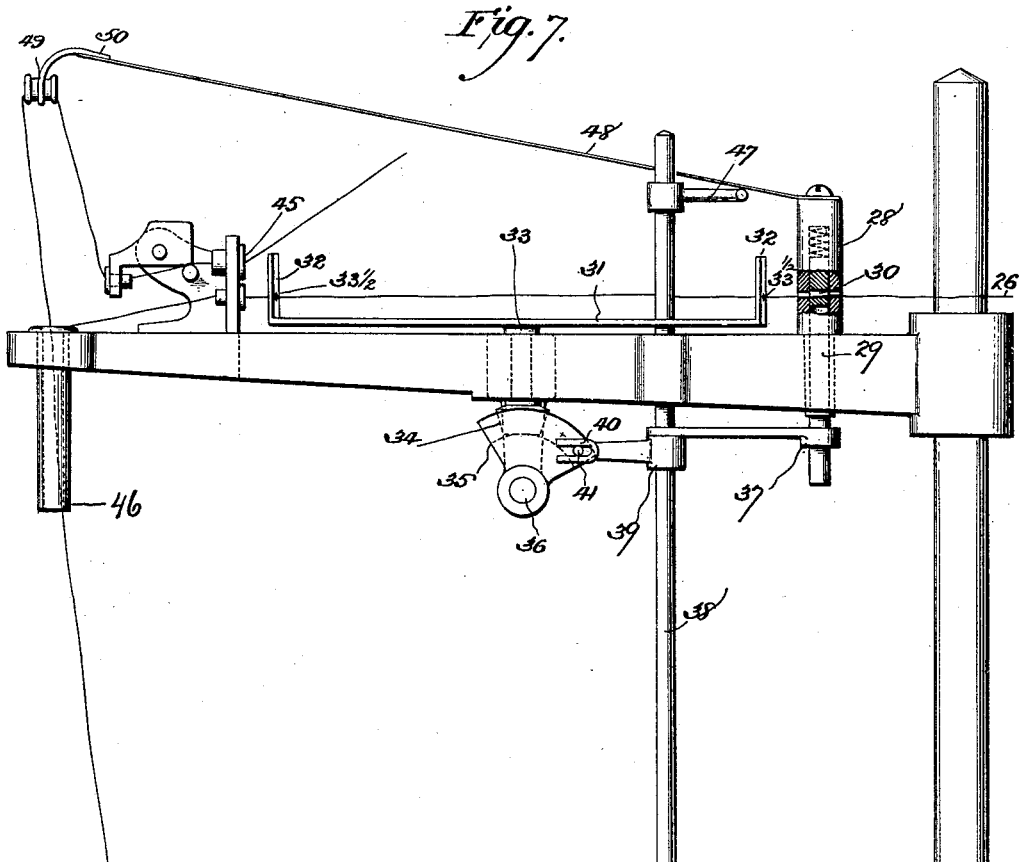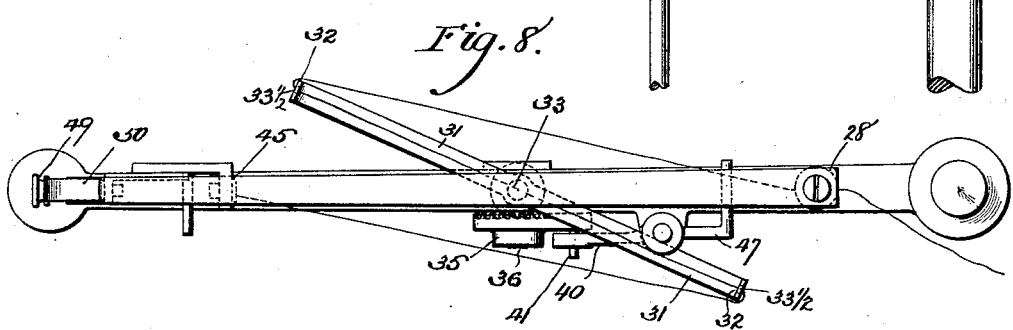

(No Model.) 8 Sheets—Sheet 6.
H. A. HOUSEMAN.
CIRCULAR KNITTING MACHINE.
No. 484,738. Patented Oct. 18, 1892.
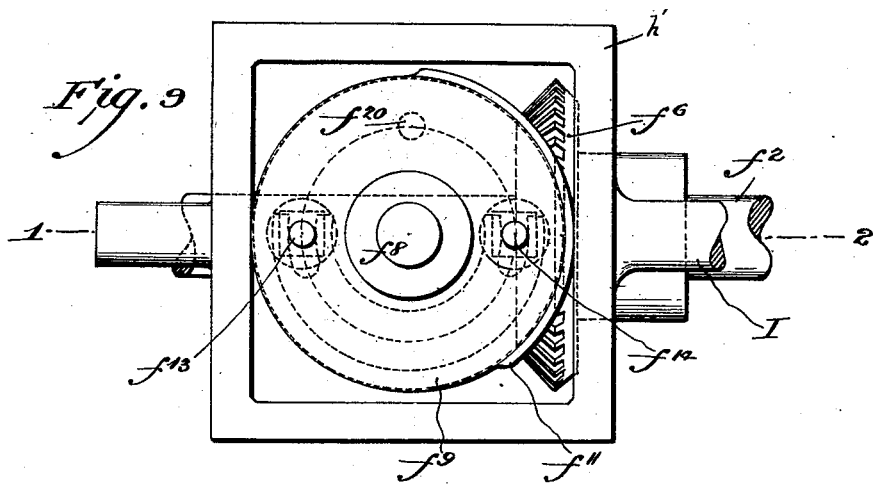
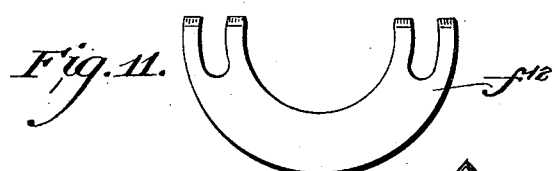
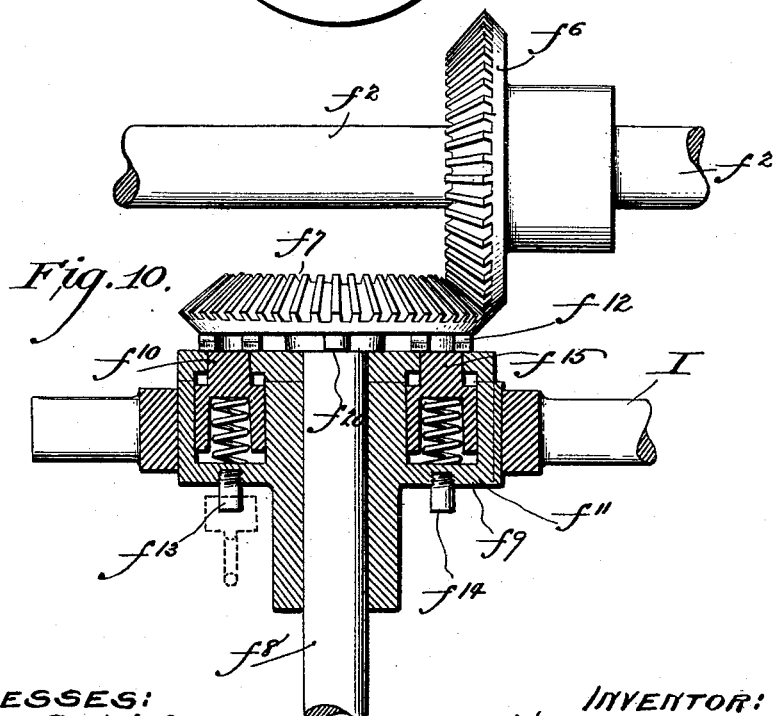
WITNESSES: INVENTOR:

(No Model.) 8 Sheets—Sheet 7.

H. A. HOUSEMAN.
CIRCULAR KNITTING MACHINE.

No. 484,738. Patented Oct. 18, 1892.

WITNESSES:
INVENTOR:

(No Model.)  
8 Sheets—Sheet 8.

H. A. HOUSEMAN.
CIRCULAR KNITTING MACHINE.

No. 484,738. Patented Oct. 18, 1892.

WITNESSES:  
INVENTOR:

UNITED STATES PATENT OFFICE.

HARRY A. HOUSEMAN, OF PHILADELPHIA, PENNSYLVANIA, ASSIGNOR TO THE STANDARD MACHINE COMPANY, OF SAME PLACE.

CIRCULAR-KNITTING MACHINE.

SPECIFICATION forming part of Letters Patent No. 484,738, dated October 18, 1892.

Application filed April 15, 1892. Serial No. 429,271. (No model.)

*To all whom it may concern:*

Be it known that I, HARRY A. HOUSEMAN, a citizen of the United States, residing at Philadelphia, county of Philadelphia, and State of Pennsylvania, have invented a new and useful Improvement in Circular-Knitting Machines, of which the following is a full, clear, and exact description, reference being had to the accompanying drawings, which form a part of this specification.

I will now describe a machine in which my improvements are embodied in the preferred form.

Figure 1:
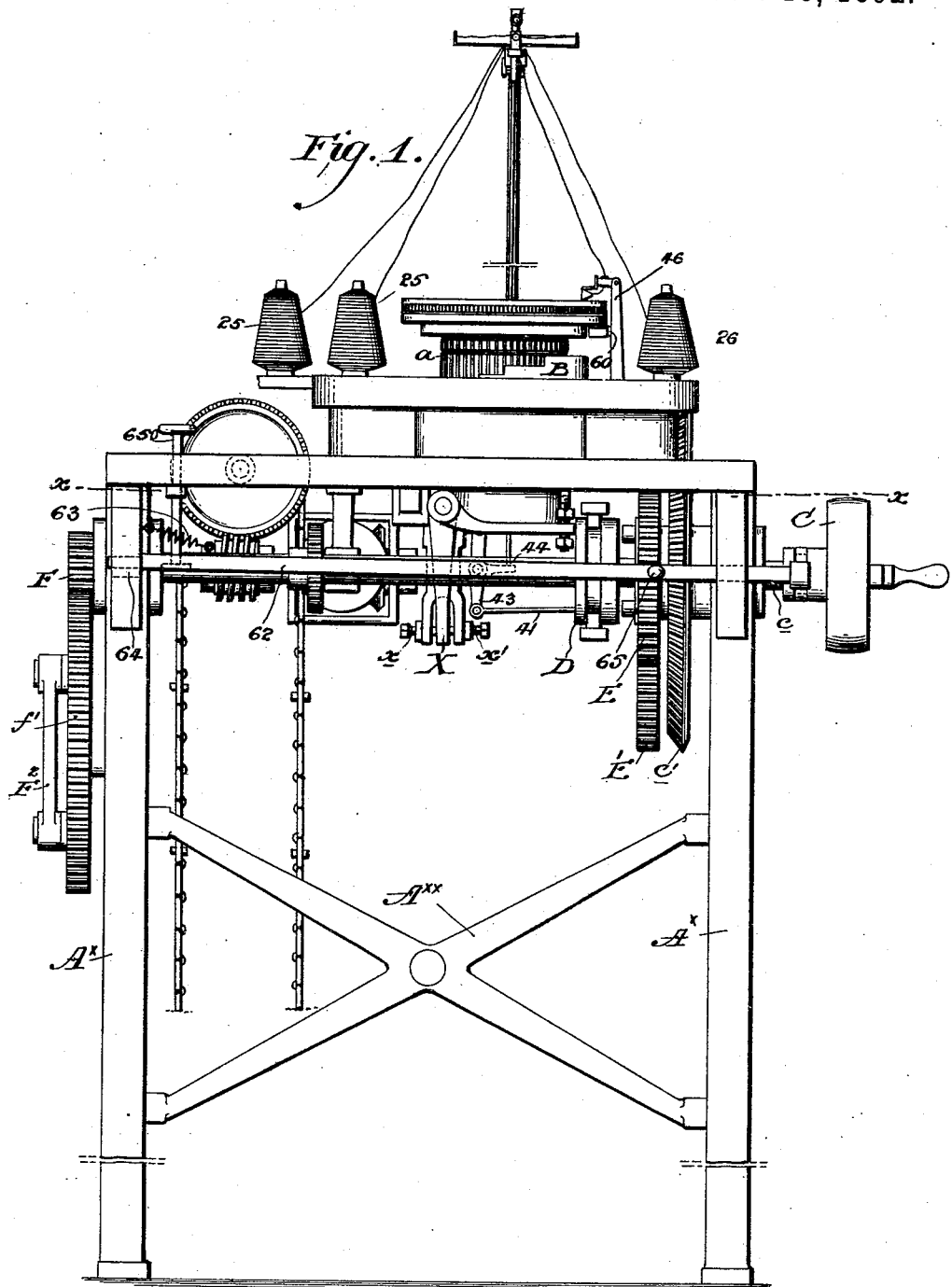
Figure 2:
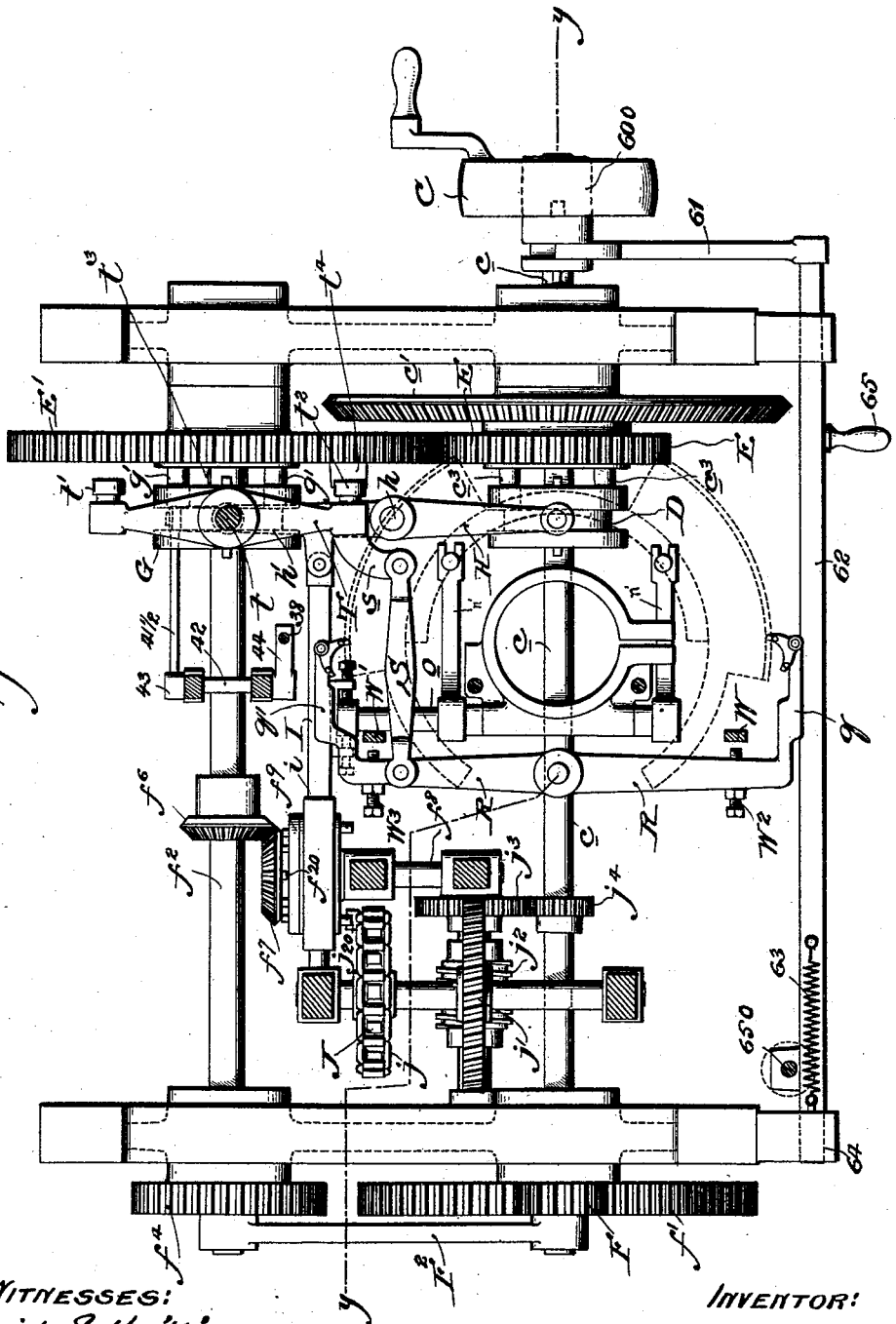
Figure 3:
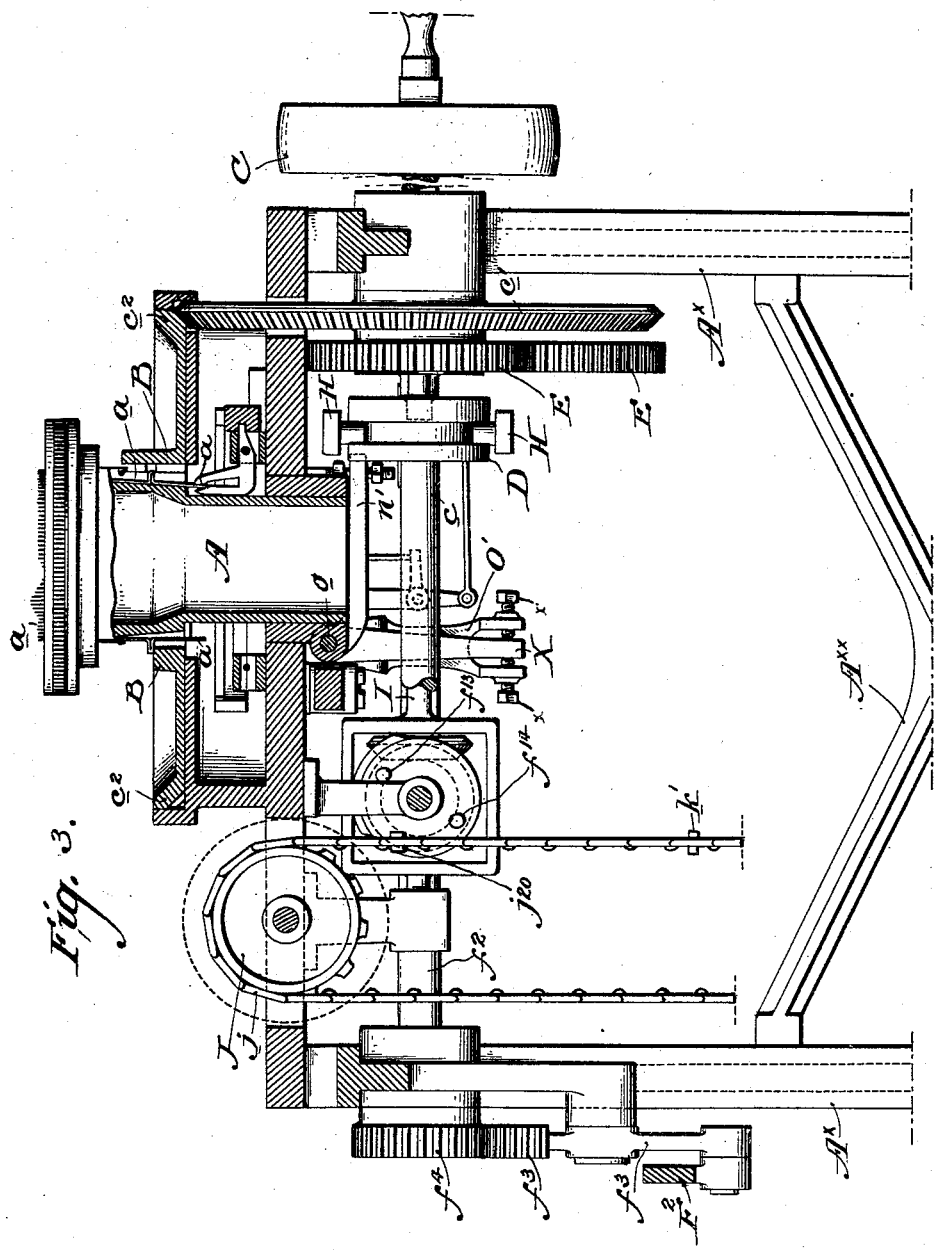
Figure 5:
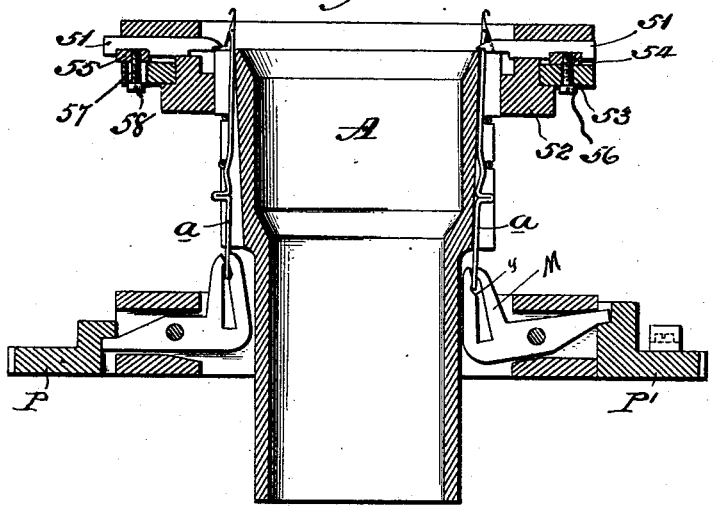
Figure 6:
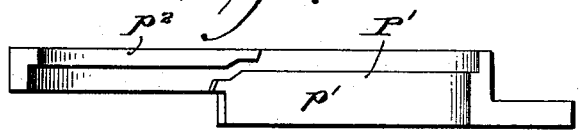
Figure 4:
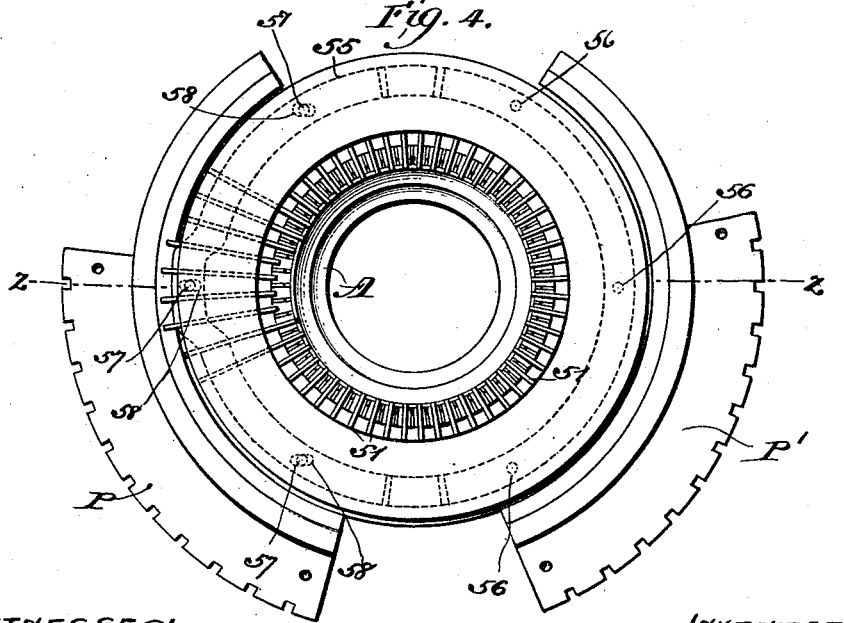
Figure 12:
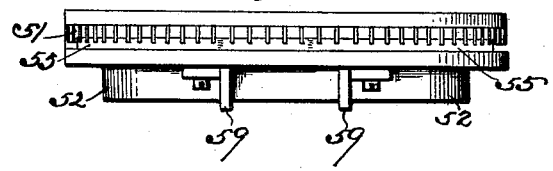
Figure 13:
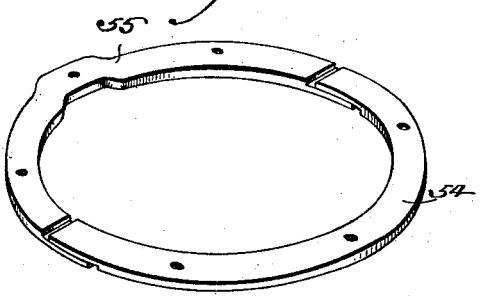
Figure 14:
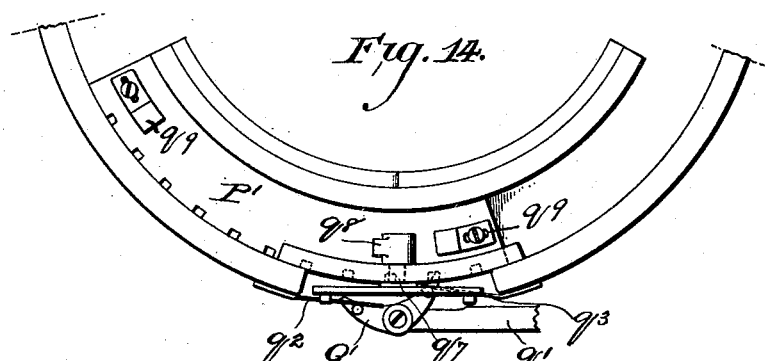
Figure 15:
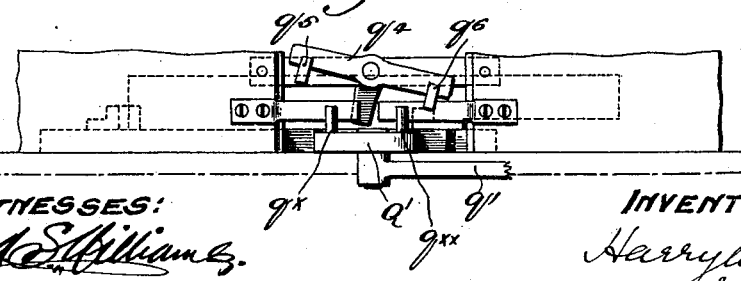
Figure 16:
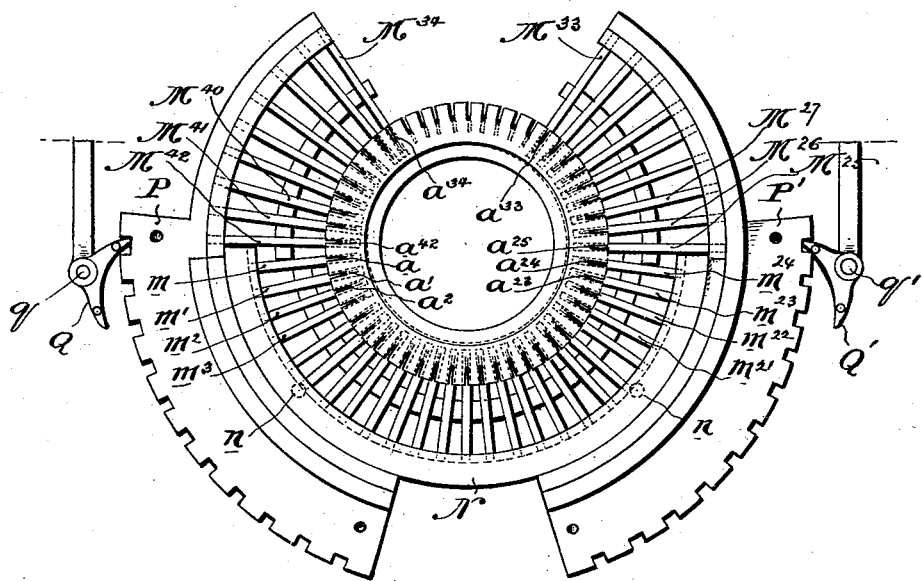

In the drawings, Figure 1 is a front elevation. Fig. 2 is a sectional plan on the line $x\ x$ of Fig. 1. Fig. 3 is a sectional view on the line $y\ y$ of Fig. 2. Fig. 4 is a detached plan view of the sinker-head and needle-cylinder. Fig. 5 is a section on the line $z\ z$ of Fig. 4. Fig. 6 is a detached view of one of the needle-shifting cam-plates. Fig. 7 is a side elevation, on an enlarged scale, of the upper portion of the yarn-guides of the yarn-take-up mechanism. Fig. 8 is a plan view of the same. Fig. 9 is a detached front elevation of a portion of the reversing mechanism of the machine. Fig. 10 is a section on the line 1 2 of Fig. 9. Fig. 11 is a detached front elevation of the plate. Fig. 12 is a front elevation of the sinker-head. Fig. 13 is a perspective view of the cam-ring used in the sinker-head. Fig. 14 is a plan view of a portion of the feed mechanism for controlling the needles. Fig. 15 is a front elevation of the same. Fig. 16 is a plan view of the needle-operating mechanism.

A is the needle-cylinder, in which are the needles $a$.

B is the knitting-cylinder, carrying the operating-cams, as in the ordinary machine.

C is the driving-pulley.

$c$ is the main driving-shaft.

$c'$ is a bevel-gear loose on the main driving-shaft and engaging the rack $c^2$ on the knitting-cylinder.

D is a clutch feathered on the main driving-shaft.

$c^3\ c^3$ are lugs on the hub of the bevel-gear $c'$, and the clutch D is adapted to engage said lugs $c^3\ c^3$, so that when said clutch is in engagement with the bevel-gear $c'$ the cam-cylinder is rotated.

In making the heel and toe of a stocking the cam-cylinder, in place of being rotated, is reciprocated, and this is accomplished in the following manner: Secured to one end of the shaft $c$ is a pinion F, which engages with the gear-wheel $f'$. Pivoted to the gear-wheel $f'$ is a connecting-rod $F^2$, one end of which is carried by the lower portion of the segmental rack $f^3$, which meshes with the pinion $f^4$ on the shaft $f^2$. Upon the other end of this shaft $f^2$ is the clutch G, adapted to engage with the lugs $g'\ g'$ upon the gear-wheel E', the gear-wheel E' engaging the gear-wheel E, which is keyed on the hub of the bevel gear-wheel $c'$, so that they revolve together. Upon the shaft $f^2$ is the bevel-wheel $f^6$, which meshes with the bevel-wheel $f^7$, loose on the shaft $f^8$. This bevel-wheel $f^7$ is provided with a pin $f^{20}$. $f^9$ is a clutch-roller provided with spring-pins $f^{10}$, said roller having a raised or cam portion $f^{11}$, said roller $f^9$ being fixed to the shaft $f^8$. Between the roller $f^9$ and the bevel-gear $f^7$ is the segmental shield $f^{12}$, held in firm position. The pins $f^{10}$ and $f^{15}$ rest against the solid portion of said shield, while the pin $f^{20}$ reciprocates in the open portion. Upon the roller $f^9$ are the lugs $f^{13}$ and $f^{14}$. H is a clutch-lever pivoted at $h$ and having forked ends, which encircle the clutches G and D, and, as may be readily seen, the construction and arrangement are such that when it is operated it throws one clutch into connection and the other clutch out of connection. This rod H is operated in the following manner: I is the connecting-rod, one end being connected to the clutch-lever H. This rod has connected to it or formed with it the frame $h'$, which surrounds the clutch-roller $f^9$, as shown in Fig. 2. The other end of this rod has a bearing at $i$. J is a sprocket-wheel, upon which travels the sprocket-chain $j$. This sprocket-wheel is driven in the following manner: Upon the shaft of the sprocket-wheel J is the worm-wheel $j'$, driven by the worm $j^2$, the worm $j^2$ being on the same shaft as the gear-wheel $j^3$, which is driven by the gear-wheel $j^4$ upon the main driving-shaft. The sprocket-wheel is thus continuously driven, carrying around it the sprocket-chain $j$. The position of the clutch-lever H at the commencement of knitting is such that the clutch D is in engagement with the bevel-gear $c'$, and the knitting-cylinder is rotated. Upon the sprocket-chain $j$ is the lug $j^{20}$, and upon the clutch-roller $f^9$ are two lugs $f^{13}$ $f^{14}$. The lug $J^{20}$ strikes the lug $f^{13}$, turning the roller $f^9$, so that the pin $f^{10}$ is brought opposite the open space and beyond the shield, when it flies outward in line with the movement of the pin $f^{20}$, and when it is struck by said pin the clutch-roller is turned and the cam portion of said clutch-roller acts upon the frame, which moves the connecting-rod I, operating the clutch-rod to force the clutch G into connection with the gear-wheel E′, and moves the clutch D out of engagement with the bevel-gear $c'$, which causes the bevel-gear to reciprocate, thus reciprocating the knitting-cylinder, the pin $f^{20}$ on the bevel-gear $f^7$ having pushed the pin $f^{10}$ to the extent of the movement of the bevel-wheel $f^7$. The clutch remains in this position, the cam-roller resting against the frame and locking in said position. The clutch is released from the position on the finishing of the heel and toe by another lug upon the sprocket-chain, striking the lug $f^{14}$ on the clutch-roller, turning said clutch-roller one-half turn and carrying the other spring-pin $f^{15}$ beyond the shield, so that it moves outward into the open space in line with the pin on the bevel-gear, so that said pin strikes it, turning the roller farther in the same direction, and the cam-face of the roller acts upon the opposite side of the frame, moving the connecting-rod in the opposite direction, releasing the clutch G, and throwing the clutch D into engagement when the cylinder is again rotated. When the machine is first operated in forming the leg of the stocking, the cam-cylinder is rotated continuously and the sprocket-chain is carried around the sprocket-wheel slowly by the mechanism used, and the lug $J^{20}$ is placed in such a position upon the chain that it strikes the lug $f^{13}$ at the point where the heel and toe are to be formed, and the lug $k'$ strikes the lug $f^{14}$ at the point where the heel and toe are finished.

In forming the heel and toe, as is well known, about half of the needles are thrown out of action. I accomplish this in the following manner: The needles $a$ $a'$ $a^2$ rest in slots in the knitting-cylinder and the shanks of the needles are inclosed in the jaws of the needle-levers M M′ M², each lever being pivoted and having a tail-piece. The tail-pieces of the levers M M′ M² to M²⁴ of the needles $a$ $a'$ $a^2$ to $a^{24}$, which are to be thrown out of action simultaneously when the heel and toe are to be knitted, rest in a groove in the plate N. This plate N has the pins $n$ $n$, which are connected to the forked rods $n'$ $n'$, which forked rods are secured on the shaft O. On the shaft O is the lever X. O′ is a stand which is connected to the connecting-rod I. $x$ $x'$ are set-screws which pass through said stand in line with the lever X, rocking the shaft O and moving the plate N, lifting the end of the levers M M′ to M²⁴, forcing the corresponding needles out of action of the knitting-cylinder. As before described, at the end of knitting the heel or toe the other set-screw $x'$ rocks the shaft in the opposite direction, depressing the lever and again bringing the needles into action. The mouth or jaw of each of the levers has the inset $y$, which supports the needle when forced in out of action. In knitting the heel and toe the remainder of the needles are used and one from each side is throw out of action at each reciprocation of the knitting-cylinder until the goods are narrowed sufficiently. Then one from each side is thrown into action until the heel or toe is completed. These needles, thrown out of action in narrowing and into action in widening, are called "fashioning-needles." I accomplish this in the following manner: $a^{25}$ to $a^{42}$ are needles used in forming the heel and toe, although, of course, their number may be varied, as desired. Each of these needles is inclosed in the jaws of a pivoted lever M²⁵ to M⁴². (See Fig. 16.) P² P³ are the fashioning-needle-operating cams, which cams are connected to the rack-plates P P′, preferably being integral therewith, as shown. Q Q′ are two double pawls, one for each rack-plate, pivoted to supports $q$ $q'$. $q^2$ $q^3$ are springs, which act upon the pins $q^{\times}$ $q^{\times\times}$ of the pawls on each side of said pawls to hold said pawl against the rack. $q^4$ is a rod having projections $q^5$ $q^6$, one on each end of said rod, and said rod $q^4$ is connected to a rock-shaft $q^7$, which extends through the plate of the machine and has a depending arm $q^8$. The projections $q^9$ at each end of the plates P P′ are adapted to strike the corresponding depending arm $q^8$. The supports $q$ $q'$ are connected one to each end of the lever R. S is a link, one end pivoted to the lever R and the other end to the arms $s$. The arm $s$ is connected to the lever T, pivoted at $t$ to clutch-rod H. Upon this lever T are lugs $t'$ $t^2$, one at the outer and one at the inner end of the lever T, and corresponding lugs $t^3$ $t^4$ are upon the gear-wheel E′. When the clutch G is thrown into engagement with the gear-wheel E′, the lugs $t'$ $t^2$ are brought into the line of travel of the lugs $t^3$ $t^4$, and as the gear-wheel reciprocates the lugs $t'$ $t^2$ are alternately struck, and the lever T vibrates first in one direction and then in the other. The lever R vibrates on its pivot-point, operating upon first one pawl and then the other, the return movement drawing one pawl and then the other back to engage the next tooth. As before described, the ends of the levers M²⁵ to M⁴² are in line of travel of the cams P² P³, and as the cams P² P³ strike them they lift up the end, forcing the needle in out of action. The cams act upon first one needle and then the next until the last tooth is reached, when one of the projections $q^9$ on each cam strikes the arm $q^8$, which turns the shaft so that the pin $q^5$ is released from engagement with its corresponding spring and the other pin forced against its corresponding spring, thus rendering one spring inactive and the other active, turning the pawl from the former direction and rendering the other end of each pawl active. A further movement reverses the rack, depressing one by one on each side, the ends of the levers M$^{25}$ to M$^{42}$ bringing the needles forward and into action one by one until the last tooth in the rack is reached near the projection $q^9$, means hereinbefore described rendering the other end of the pawl active. When the rod I is operated, as described, and the clutch G thrown out of action, the lugs $t'\,t^2$ are drawn out of line of the lugs $t^3\,t^4$. Upon the plate of the machine are secured the guards W W' and set-screws W$^2$ W$^3$, passing through the lever R, so that the throw of the said lever R may be limited.

It is advisable in forming the heel and toe that an additional thread should be used with those used in forming the foot and leg, and it is also advisable that this thread should be readily brought into action and retired from action, when required, and it is also advisable that a greater tension should be put upon the thread when the heel and toe are being formed than in the case of the tubular goods. I accomplish this in my machine in the following manner: 25 25 show the spools carrying the threads used in forming the tubular part of the goods, and 26 shows the spool carrying the thread which is to be used, in addition to the other two, in forming the heel or toe. This last thread, as shown in Fig. 7, passes through a slot in a tube 28, the tube having a spring-plunger 29, provided with an orifice 30, through which said thread also passes. The thread then passes through the frame 31, provided with the uprights 32, said uprights having orifices $33\frac{1}{2}$, through which said thread passes. This frame 31 is supported on the shaft 33, which has at its end the bevel-gear 34, which meshes with the segmental gear 35, pivoted at 36. The plunger 29 is sleeved upon the arm 37, which surrounds the rod 38. Sleeved upon the rod 38 is the arm 39, having the forked ends 40, in which a pin 41 upon the segmental gear 35 rests. Connected to the clutch-lever H is the arm $41\frac{1}{2}$. 42 is a rock-shaft, and depending from said rock-shaft is the arm 43, to which is connected the arm $41\frac{1}{2}$. 44 is an arm projecting from said rock-shaft and in line with the bottom of the rod 38, so that when said clutch-lever is moved to throw in the clutch G the arm 44 is elevated, elevating the rod 38, which brings the plunger 29 into such position that the hole in the plunger is in line with the hole in the case 28, and also moves the segmental bevel-gear 35, so that the frame 31 is in such a position that the orifices in the uprights 32 are also in line with the openings in the plunger 29 and case 28. The thread after passing through the uprights $33\frac{1}{2}$ passes below the thread-guide 45, and thence to the thread-carrier 46. Projecting from the rod 38 is the arm 47, upon which rests the spring-arm 48, the other end of the spring-arm being connected to the guide 49 for the main threads by means of arm 50. When this arm 47 is lifted, as before described, the spring is lifted so that it elevates the arm 50, thus lifting up said thread-guide and creating a greater tension upon the same thread. When the clutch G is disengaged and the clutch D engaged, the movement of the clutch-lever to accomplish this moves the arm 44 downward, allowing the rod 38 to drop. The plunger 29 falls with the rod 38, and the orifice in said plunger is brought out of line with the orifice in the plunger-case 28, thereby locking the thread, so that any further movement of the thread-carrier, so far as said third thread is concerned, will break the third thread at the needle. At the same time the arm 39 falls, and through its forked end 40 and the pin 41 the segmental gear 35 is turned, which brings the frame 31 into the position shown in Fig. 8, which draws up the supplemental thread, as clearly shown in said figure, so that it is out of the way of the threads used in the knitting the circular goods.

In my machine I have, also, an improvement in the mechanism for operating the sinker-cam, as shown in Figs. 4, 5, 12, and 13. 51 illustrates my sinker, which rests in insets in the sinker-head and presses against the work, and, as is well known, it is desirable and necessary to relieve this strain on the work of each needle at the time when the thread is being carried around said needle. 52 is the sinker-head, and 53 is the sinker-cam plate. Connected to this sinker-cam plate is the sinker-cam 54. (Shown in perspective in Fig. 13.) This sinker-cam is made in two parts, said parts overlapping each other, as shown in the above-mentioned figure, at their point of union. One portion of this sinker-cam has the inset 55. The portion of the sinker-cam which is not provided with the inset is secured rigidly by screws 56 to the sinker-cam plate, the other portion being secured by the screws 58, which pass through the cam-plate 53 and are secured in slots 57 in the sinker-cam plate. The object in connecting the portion having the insets 55 in this manner is that it becomes necessary to move the sinkers in or out a greater distance, according to the character of the work, and by forming by cam in the manner in which I have I can readily adjust the portion which has the inset 55, so that the inset portion 55 will extend farther out or be closer in with relation to the other part of the cam. Upon the cam-plate are the lugs 59, which are in the line of movement of the projection 60 upon the thread-carrier, so that when said thread-carrier strikes the lug on the cam-plate said cam-plate is carried forward and the sinker is held in the position shown on the right side of Fig. 5 until the inset portion reaches said sinker, the inset portion being behind the thread-carrier when the sinker-head is drawn out by one cam-face of said inset and returned into position after the thread-carrier has passed by the other cam-face. When the heel and toe are being formed, the thread-carrier reciprocates, so that it alternately strikes each of the lugs on the sinker-cam plate.

I also use in my machine a novel arrangement of clutch mechanism, whereby the main driving-shaft can be stopped by the operator of the machine. The pulley C is loose upon the main driving-shaft c and is provided with the clutch mechanism, whereby it can be driven into engagement with the hub 600, which is fixed upon the said shaft. 61 is a forked rod, which surrounds said clutch mechanism and is connected with the rod 62, adapted to slide. The end of this rod has the spring 63 attached to it, which is connected to a fixed portion of the machine. When the rod is in the position 60 to 62, the mechanism is out of engagement and the rod 62 rests in the slot 64 and is held therein by the spring 63. When the handle 65 is pushed to the right and the rod 62 is drawn with it, so that its end is carried out of the orifice, the spring 63 lifts said rod and brings the end of said rod above the orifice, thus locking the rod 62 against any return movement and throwing the mechanism into operation. 650 is a plunger, the lower end of which rests against the rod 62, its upper end projecting above the plate of the machine, so that when the rod 62 is in the position last described and the mechanism is operating and it is desired to stop the mechanism plunger 650 is pushed down, which forces the rod 62 down until it comes in line with the orifice 64, when the spring 63 throws it into said orifice, stopping the mechanism. By this means I provide a ready means of starting and stopping the mechanism at each machine, the main driving mechanism for a series of machines still going on as usual. Also, by this mechanism I lock the starting and stopping at each end of its movement, so that the same cannot be changed, except by the will of the operator or by some means operating upon said springs 63.

Having now fully described my invention, what I claim, and desire to protect by Letters Patent, is—

1. In combination, a knitting-cylinder, a rotary shaft, a clutch upon said shaft, an oscillating shaft, a clutch upon said shaft, a gear-wheel adapted to be engaged by said clutch upon the rotary shaft, a gear-wheel adapted to be engaged by the clutch on the oscillating shaft, connections between said gear-wheels and the knitting-cylinder, a clutch-lever common to both clutches, a connecting-rod connected to said lever, and intermediate connections between the oscillating shaft and connecting-rod, whereby the clutches are operated from the movement of the oscillating shaft.

2. In combination, a knitting-cylinder, a rotary shaft, a clutch upon said shaft, an oscillating shaft, a clutch upon said shaft, a gear-wheel adapted to be engaged by said clutch upon the rotary shaft, a gear-wheel adapted to be engaged by the clutch on the oscillating shaft, connections between said gear-wheels and the knitting-cylinder, a clutch-lever common to both clutches, a connecting-rod connected to said lever, a gear upon said oscillating shaft, a gear-wheel loose upon its shaft, with which said last-mentioned gear meshes, a clutch upon said shaft, means, substantially as described, to operate said clutch, and intermediate connections between said clutch and the connecting-rod of the clutch-lever, whereby when said shaft is operated the connecting-rod is moved.

3. In combination, a knitting-cylinder, a rotary shaft, a clutch upon said shaft, an oscillating shaft, a clutch upon said shaft, a gear-wheel adapted to be engaged by said clutch upon the rotary shaft, a gear-wheel adapted to be engaged by the clutch on the oscillating shaft, connections between said gear-wheels and the knitting-cylinder, a clutch-lever common to both clutches, a connecting-rod connected to said lever, said connecting-rod being provided with a frame portion, as $h'$, a clutch-roller, as $f^9$, which said frame surrounds, a shaft for said clutch-roller, a clutch upon said shaft, a gear-wheel loose on said shaft, a gear-wheel upon the oscillating shaft in engagement with said last-mentioned gear-wheel, and mechanism, substantially as described, to operate said clutch.

4. In combination, a knitting-cylinder, a rotary shaft, a clutch upon said shaft, an oscillating shaft, a clutch upon said shaft, a gear-wheel adapted to be engaged by said clutch upon the rotary shaft, a gear-wheel adapted to be engaged by the clutch on the oscillating shaft, connections between said gear-wheels and the knitting-cylinder, a clutch-lever common to both clutches, a connecting-rod connected to said lever, a gear upon said oscillating shaft, a gear-wheel loose upon its shaft, with which last gear meshes, a clutch upon said shaft, intermediate connection between said clutch and connecting-rod, a pattern-chain operated by the rotating shaft, lugs upon said chain, and lugs upon the clutch mechanism, adapted to be struck by the lugs on the pattern-chain.

5. In combination, a knitting-cylinder, a rotary shaft, a clutch upon said shaft, an oscillating shaft, a clutch upon said shaft, a gear-wheel adapted to be engaged by said clutch upon the rotary shaft, a gear-wheel adapted to be engaged by the clutch on the oscillating shaft, connections between said gear-wheels and the knitting-cylinder, a clutch-lever common to both clutches, a connecting-rod connected to said lever, said connecting-rod being provided with a frame portion, as $h'$, a clutch-roller, as $f^9$, which said frame surrounds, a shaft to which said clutch-roller is secured, a clutch upon said shaft, a gear-wheel loose on said shaft, a gear-wheel upon the oscillating shaft in engagement with said last-mentioned gear-wheel, a pattern-chain operated by the rotating shaft, lugs upon said chain, and lugs upon the clutch mechanism, adapted to be struck by the lugs on the pattern-chain.

6. In combination, a knitting-cylinder, a rotary shaft, a clutch upon said shaft, an oscillating shaft, a clutch upon said shaft, a gear-wheel adapted to be engaged by said clutch upon the rotary shaft, a gear-wheel adapted to be engaged by the clutch on the oscillating shaft, connections between said gear-wheels and the knitting-cylinder, a clutch-lever common to both clutches, a connecting-rod connected to said lever, said connecting-rod being provided with a frame portion, as $h'$, a clutch-roller, as $f^9$, which said frame surrounds, spring-seated pins in said clutch-roller, a gear-wheel loose on said shaft, a pin connected to said gear, a segmental shield, as $f^{12}$, between said clutch-roller and said gear-wheel, a gear upon said oscillating shaft, which meshes with said last-mentioned gear, lugs upon said clutch-roller, a pattern-chain operated by the rotary shaft, and lugs upon said chain adapted to strike the lugs upon the clutch-roller.

7. In a knitting-machine, in combination, a knitting-cylinder, a rotary shaft, a clutch upon said shaft, an oscillating shaft, a clutch on said shaft, a gear-wheel adapted to be engaged by the clutch on the rotary shaft, a gear-wheel adapted to be engaged by the clutch on the oscillating shaft, a clutch-lever common to both clutches, an arm connected to said clutch-lever, a rock-shaft, an arm 43 from said rock-shaft, to which the arm connected to said clutch-lever is connected, a rod supported so as to be adapted to move vertically, an arm connected to said rock-shaft in line of movement of said rod, a plunger connected to said rod, and a tube in which said plunger moves, said plunger being provided with a slot and the walls of said tube having a slot, through which slot the thread is adapted to pass.

8. In a knitting-machine, in combination, a thread-spool, a tube the walls of which are provided with slots, a plunger adapted to move in said tube, said plunger being provided with a slot, the thread being adapted to pass through said slots, and means, substantially as described, to give said plunger a movement independent of the movement of the thread.

9. In a knitting-machine, in combination, a knitting-cylinder, a rotary shaft, a clutch upon said shaft, an oscillating shaft, a clutch on said shaft, a gear-wheel adapted to be engaged by the clutch on the rotary shaft, a gear-wheel adapted to be engaged by the clutch on the oscillating shaft, a clutch-lever common to both clutches, a thread-spool, a tube, a plunger adapted to move in said tube, said plunger being provided with a slot and the walls of said tube having slots through which the thread passes, and intermediate mechanism between said clutch-lever and plunger, whereby when the clutch-lever is moved the plunger moves up or down.

10. In a knitting-machine, in combination, a knitting-cylinder, a rotary shaft, a clutch upon said shaft, an oscillating shaft, a clutch on said shaft, a gear-wheel adapted to be engaged by the clutch on the rotary shaft, a gear-wheel adapted to be engaged by the clutch on the oscillating shaft, a clutch-lever common to both clutches, an arm connected to said clutch-lever, a rock-shaft, an arm 43 from said rock-shaft, to which the arm connected to clutch-lever is connected, a rod supported so as to be adapted to move vertically, an arm connected to said rock-shaft in line of movement of said rod, a forked arm connected to said rod, a segmental gear provided with a pin which rests in the forked end of said arm, a bevel-gear meshing in said segmental gear, and a frame on the shaft of said bevel-gear, said frame being provided with slots through which a thread is adapted to pass.

11. In a knitting-machine, in combination, a knitting-cylinder, a rotary shaft, a clutch upon said shaft, an oscillating shaft, a clutch on said shaft, a gear-wheel adapted to be engaged by the clutch on the rotary shaft, a gear-wheel adapted to be engaged by the clutch on the oscillating shaft, a clutch-lever common to both clutches, an arm connected to said clutch-lever, a rock-shaft, an arm 43 from said rock-shaft, to which the arm connected to clutch-lever is connected, a rod supported so as to be adapted to move vertically, an arm connected to said rock-shaft in line of movement of said rod, a plunger connected to said rod, a tube in which said plunger moves, said plunger and tube being provided with transverse slots, and uprights attached to said frame, said uprights being provided with slots through which thread is adapted to pass.

12. In a knitting-machine, in combination, a thread-spool, and a frame secured so as to be rotatable horizontally, said frame being provided with slots through which thread is adapted to pass.

13. In a knitting-machine, in combination, a thread-spool, a frame secured so as to be rotatable, said frame being provided with slots through which the thread is adapted to pass, and means, substantially as described, to rotate said frame independent of the movement of the thread.

14. In a knitting-machine, in combination, a frame secured so as to be rotatable horizontally, and uprights attached to said frame, said uprights being provided with slots through which the thread is adapted to pass.

15. In a knitting-machine, in combination, a frame secured so as to be rotatable, uprights attached to said frame, said uprights being provided with slots through which the thread is adapted to pass, and means, substantially as described, independent of the thread to rotate said frame.

16. In a knitting-machine, in combination, a knitting-cylinder, a rotary shaft, a clutch upon said shaft, an oscillating shaft, a clutch on said shaft, a gear-wheel adapted to be engaged by the clutch on the rotary shaft, a gear-wheel adapted to be engaged by the clutch on the oscillating shaft, a clutch-lever common to both clutches, a frame secured so as to be rotatable, said frame being provided with slots through which the thread is adapted to pass, and intermedial mechanism, substantially as described, between the frame and clutch-lever, whereby when the clutch-lever is moved the frame is revolved.

17. In a knitting-machine, in combination, a knitting-cylinder, a rotary shaft, a clutch upon said shaft, an oscillating shaft, a clutch on said shaft, a gear-wheel adapted to be engaged by the clutch on the rotary shaft, a gear-wheel adapted to be engaged by the clutch on the oscillating shaft, a clutch-lever common to both clutches, a frame secured so as to be rotated, uprights attached to said frame, said uprights being provided with slots through which the thread is adapted to pass, and intermedial mechanism, substantially as described, between the frame and clutch-lever, whereby when the clutch-lever is moved the frame is revolved.

18. In a knitting-machine, in combination, a knitting-cylinder, a rotary shaft, a clutch upon said shaft, an oscillating shaft, a clutch on said shaft, a gear-wheel adapted to be engaged by the clutch on the rotary shaft, a gear-wheel adapted to be engaged by the clutch on the oscillating shaft, a clutch-lever common to both clutches, an arm connected to said clutch-lever, a rock-shaft, an arm 43 from said rock-shaft, to which the arm connected to clutch-lever is connected, a rod supported so as to be adapted to move vertically, an arm connected to said rock-shaft in line of movement of said rod, an arm, as 47, connected to said rod, a spring-arm, as 48, in line of movement of said arm 47, and a thread-guide, as 49, in the line of movement of the end of said spring, whereby when said rod is elevated the spring acts on the thread-guide, increasing the tension on the thread.

19. In a knitting-machine, in combination, a knitting-cylinder, a rotary shaft, a clutch upon said shaft, an oscillating shaft, a clutch on said shaft, a gear-wheel adapted to be engaged by the clutch on the rotary shaft, a gear-wheel adapted to be engaged by the clutch on the oscillating shaft, a clutch-lever common to both clutches, a thread-guide, a spring-arm, and intermediate connections between said spring-arm and the clutch-lever, whereby the movement of the clutch-lever in one direction renders the spring-arm active and in the other direction allows said spring-arm to become inactive.

20. In a knitting-machine, in combination, a sinker-cam formed of two parts, one part formed with an inset and said parts overlapping each other at the point of juncture.

21. In a knitting-machine, in combination, a sinker-cam formed in two parts, one part formed with an inset, the part formed with the inset being adjustably secured to the sinker-cam plate.

22. In a knitting-machine, in combination, a sinker-cam formed in two parts, one part formed with an inset, and a cam-plate provided with slots, through which slots the inset part of the sinker-cam is secured to the cam-plate and the other part being fixedly connected to said cam-plate.

23. In a knitting-machine, in combination, a main shaft, a driving pulley or wheel loose on said shaft, a clutch on said shaft adapted to engage said pulley, a clutch-rod to operate said clutch, the frame of the machine being provided with a slot, and a spring, one end attached to said rod and the other end to the frame of the machine above the slot, whereby said spring holds said clutch-rod fixed in the slot or against the frame of the machine.

24. In a knitting-machine, in combination, a main shaft, a driving pulley or wheel loose on said shaft, a clutch on said shaft adapted to engage said pulley, a clutch-rod to operate said clutch, the frame of the machine being provided with a slot, and a spring, one end attached to said rod and the other to the frame of the machine above the slot, a rod in line with said clutch-rod projecting through the bed of the machine, and a handle connected to said clutch-rod.

25. In a knitting-machine, in combination, a needle-cylinder provided with slots, pivoted levers provided with jaws adapted to hold the shanks of said needles, needle-shifting cams in line of travel of the tails of said levers, racks by which said cams are carried, pivoted double pawls adapted to work in said racks, means, substantially as described, to operate said pawls, springs adapted to press against said pawls, one at each end, a rock-shaft projecting through the frame of the machine, a rod attached to said shaft, pins upon said rod adjacent to each of said springs, a depending rod from said rock-shaft, and lugs attached to said rack-plates, whereby when the shaft is rocked one of the springs of each pawl is rendered inactive and the other active and the corresponding ends of the pawl rendered active or inactive.

In testimony of which invention I have hereunto set my hand.

HARRY A. HOUSEMAN.

Witnesses:
 WM. H. SHALLCROSS,
 GUERNSEY A. HALLOWELL.